March 30, 1954

S. J. BUDLANE 2,673,558

LIQUID FUEL BURNING HEATER

Filed Oct. 1, 1948

INVENTOR.
Stanley J. Budlane
BY
Foorman L. Mueller
Atty.

March 30, 1954  S. J. BUDLANE  2,673,558
LIQUID FUEL BURNING HEATER
Filed Oct. 1, 1948  9 Sheets-Sheet 3

INVENTOR.
Stanley J. Budlane
BY
Foorman L. Mueller
Atty

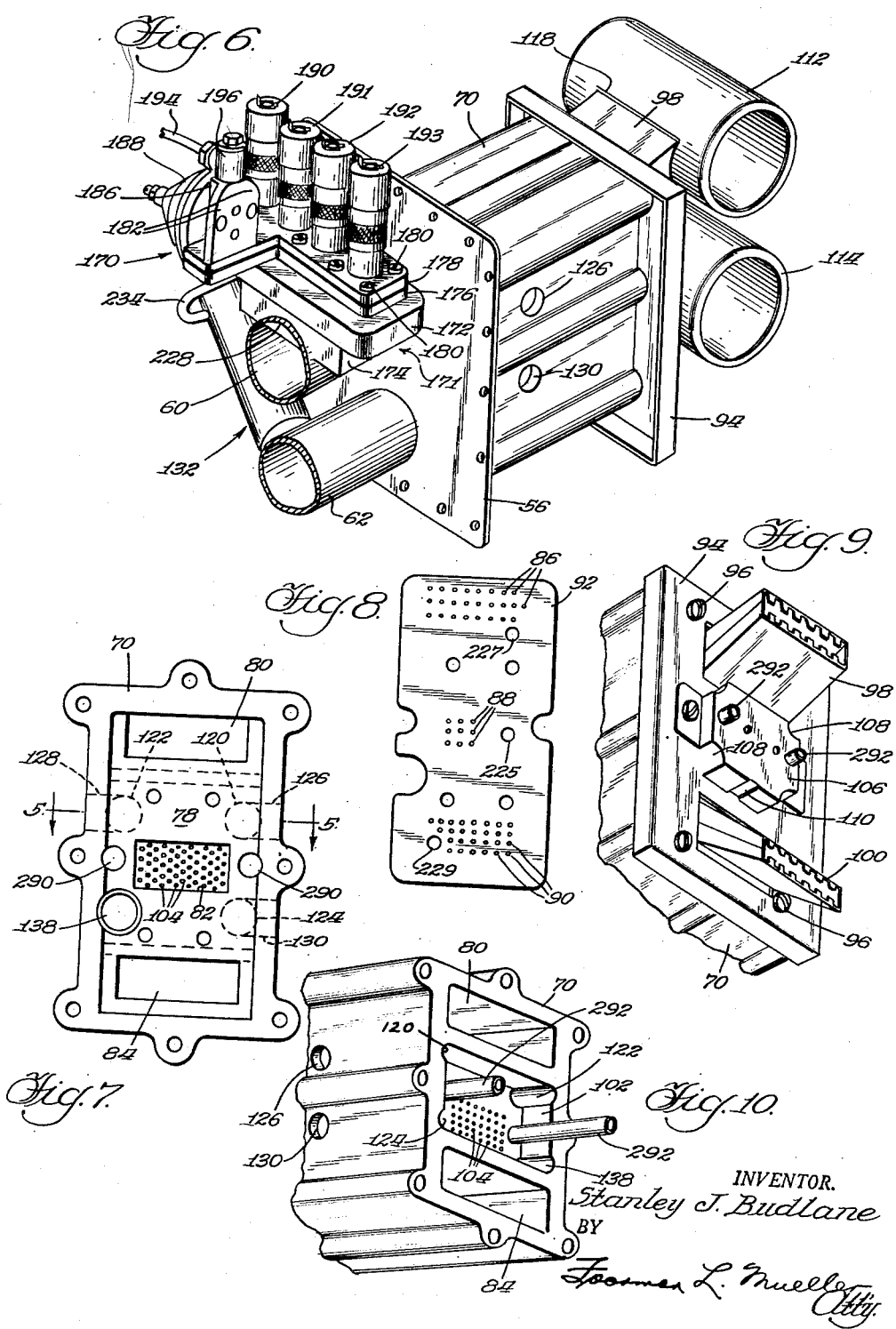

March 30, 1954

S. J. BUDLANE 2,673,558

LIQUID FUEL BURNING HEATER

Filed Oct. 1, 1948

INVENTOR.
Stanley J. Budlane
BY
Foorman L. Mueller
Atty.

March 30, 1954  S. J. BUDLANE  2,673,558
LIQUID FUEL BURNING HEATER
Filed Oct. 1, 1948  9 Sheets-Sheet 6

INVENTOR.
Stanley J. Budlane
BY
Foorman L. Mueller
Atty.

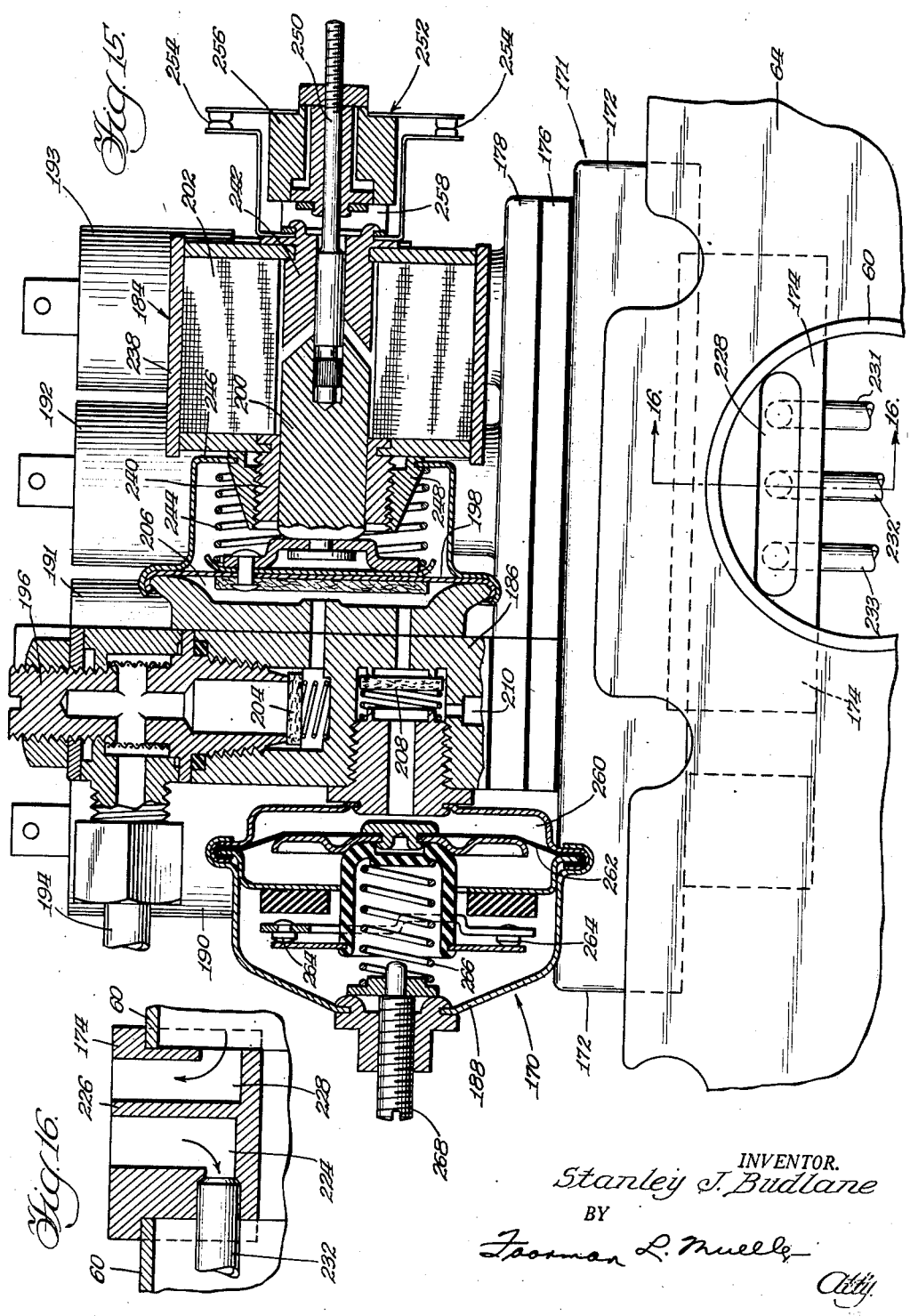

March 30, 1954

S. J. BUDLANE 2,673,558

LIQUID FUEL BURNING HEATER

Filed Oct. 1, 1948

INVENTOR.
Stanley J. Budlane
BY
Foorman L. Mueller
Atty.

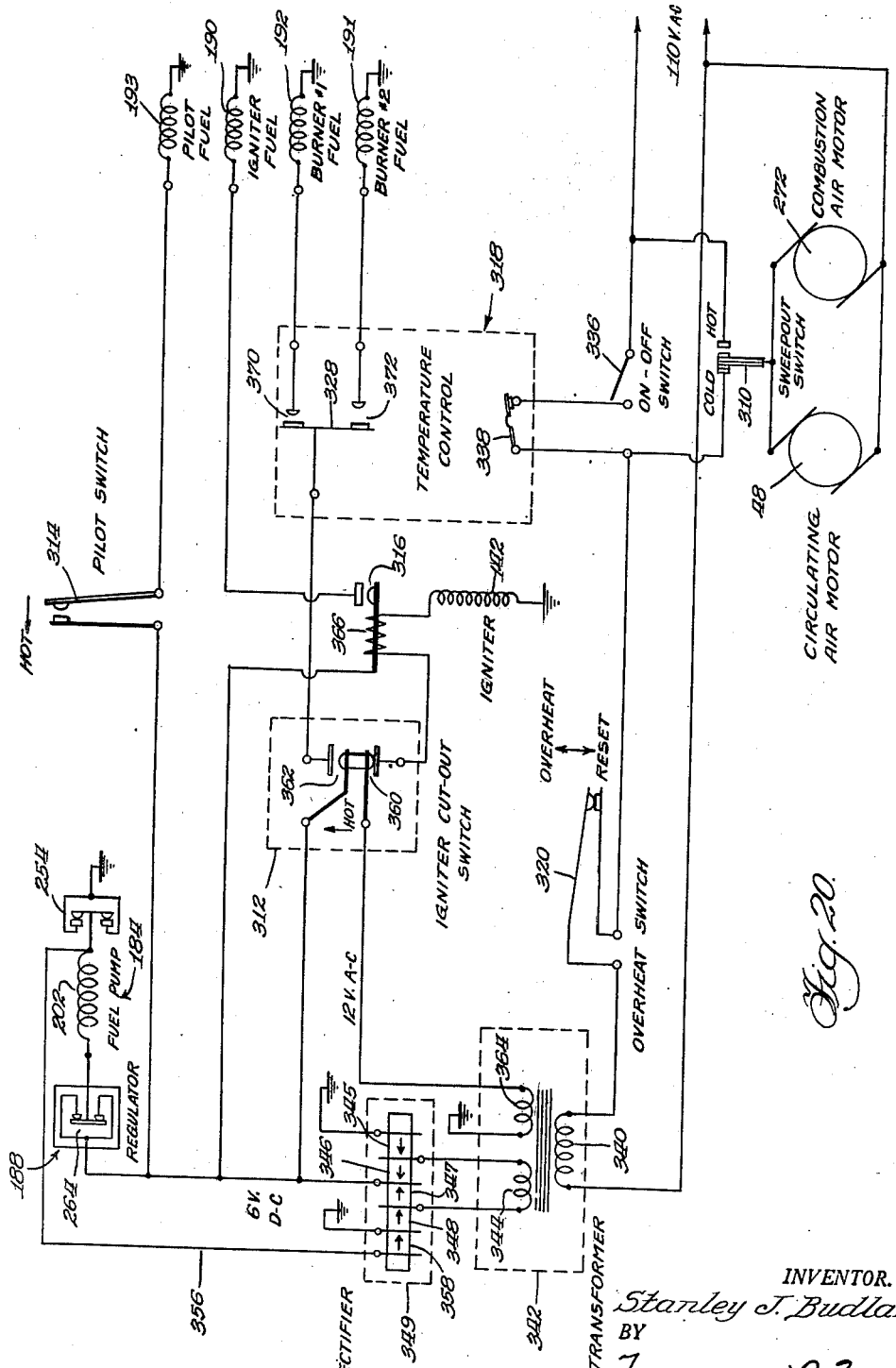

Patented Mar. 30, 1954

2,673,558

UNITED STATES PATENT OFFICE 2,673,558

LIQUID FUEL BURNING HEATER

Stanley J. Budlane, Chicago, Ill., assignor to Motorola, Inc., Chicago, Ill., a corporation of Illinois Application October 1, 1948, Serial No. 52,169

11 Claims. (Cl. 126—116)

This invention relates to air heaters adapted for use in situations where the size, cost and power consumption of such units are severely limited, and it is concerned particularly with heaters of this type utilizing liquid fuel.

There are many instances in which one may desire to utilize a liquid fuel-consuming air heater in a space of moderate size, such as an individual room or an area of a house or factory or the interior of a vehicle. Usually in these cases it is desired that the heater shall be inconspicuously small and that it shall have a compact, simple, relatively inexpensive construction. Heaters of the type in which a body of liquid fuel is burned directly at the surface thereof, or is fed through a wick to a combustion chamber, are not generally satisfactory because the burner structure is apt to be very large in proportion to the heat obtainable therefrom, and usually a chimney is required on such a heater. Another type of heater utilizes a burner which atomizes the liquid fuel or otherwise breaks up the fuel particles mechanically to produce a spray which may be burned efficiently in a relatively small combustion chamber. A heater such as this, however, requires a large amount of power for its operation, so that the saving in space achieved by using a smaller combustion chamber is offset by the added space needed to accommodate the power equipment, as well as the added cost and operating expense involved. Such arrangements are practical only in large installations and are not generally considered suitable in an individual room heater, for example.

Still another type of heater has been proposed in which the fuel is preheated to vaporize it and facilitate dispersal of the fuel particles in an air stream, thereby forming a combustible mixture which then is ignited in the combustion chamber. This method is advantageous in that the power requirement is low, efficiency is high, the equipment is not complex or expensive, and it occupies very little space.

The principle of conditioning the fuel by the application of heat has been employed with considerable success in heaters for automobiles and other vehicles. However, it has not been adopted on a commercial scale in other heaters such as household heaters. The difficulty in such cases has been due partly to the conditions under which household heaters and the like generally are operated. The demands made upon the heater for heat output are apt to be quite large (say, of the order of 40,000 B. t. u. per minute), necessitating a high rate of fuel vaporization. But this high rate of fuel vaporization has not been considered feasible heretofore (within any competitive size and weight limitations) in heaters operating on the fuel conditioning principle. The situation is further complicated by the fact that, for domestic purposes, it is preferable to use one of the heavier liquid fuels such as kerosene which is relatively cheap and non-explosive, but which also has low volatility. Many problems are encountered, therefore, in attempting to provide a satisfactory household heater or the like which complies with all of the requirements mentioned above, and to date the industry has had to content itself with various compromises among these factors in order to produce marketable heaters.

For any particular heater using a specified liquid fuel, there is a certain optimum vaporization temperature to which the fuel should be heated in order to produce the most efficient combustion. In prior heaters, utilizing liquid fuel there has been an inherent tendency for the temperature of the fuel to vary depending upon the number of burners in operation and/or the rate at which the fuel was being burned. Any variation of the fuel consumption rate would cause the temperature of the burner parts in the region where the fuel was being vaporized to vary. This would cause the performance of the heater to fluctuate in a very undesirable manner. Stabilization of the temperature at which vaporization occurs is a highly desirable feature not only in household heaters, but in substantially all heaters which consume liquid fuel and which depend for their successful operation upon the proper mixing of fuel vapor with air prior to combustion thereof.

In view of all the foregoing considerations, it is a primary object of the present invention to provide an improved liquid fuel-consuming heater for small and medium-size domestic installations which successfully embodies all of the features, such as small size, large heat output, low cost, low power consumption, simplicity and efficiency, that are desired in such a heater.

Another important object is to provide certain novel improvements which are of general application to all heaters utilizing liquid fuel.

Still another object is to provide an improved heater having pilot and main burners, all of which are adapted to utilize liquid fuel, wherein the fuel is conditioned for combustion at said burners by being vaporized in a compact but highly heat-conductive environment containing a large quantity of heat which is constantly available for transfer to the fuel.

A further object is to utilize a small pilot flame for storing heat in the aforesaid heat-conductive environment, and particularly for mainducting the temperature thereof substantially constant at an optimum value which produces rapid vaporization of the fuel without premature burning or carbonization thereof.

A still further object is to provide an improved fuel conditioning means which tends to maintain itself at a constant temperature irrespective of the rate at which fuel is consumed in the heater, and an ancillary object is to accomplish this result without resorting to electrical means for maintaining the vaporizer heated.

A still further object is to provide a novel vaporizer block adapted to be maintained at a constant temperature by the pilot burner of a heater irrespective of the number of main burners in operation or the rate of fuel consumption.

A still further object is to insure thorough vaporization, mixing of the fuel with air, and combustion of the fuel by a continuous heating and agitating action of the fuel particles until they are completely consumed.

A still further object is to provide a small, economical household heater of the liquid fuel-consuming type which will operate more efficiently than heaters which are competitive in price, and which is absolutely safe and dependable in service.

A still further object is to replace the cast parts heretofore utilized in the combustion chambers and heat exchangers of fuel-burning heaters with light-weight, inexpensive sheet metal or tubular parts.

Additional objects are to provide a novel electric igniter, a novel operating system for a liquid fuel-consuming heater and a novel form of fuel feeding assembly, all of which contribute substantially to the over-all improvement of such heaters.

As one of the features of this invention, an integral metallic vaporizer block is formed with main burner and pilot burner ports therein and with fuel conditioning passages leading through the interior of the block to the respective ports. An electric igniter element, which is part of a fuel-burning igniter structure, is employed temporarily to establish a flame that passes through a seperate igniter port or flame passage in the block and is utilized to preheat the vaporizer block so as to establish the combustible mixture issuing from the pilot burner port. The pilot flame burns continuously and is so disposed that a large share of the heat furnished by the pilot flame is contained temporarily in the vaporizer block, thereby maintaining this block substantially at a constant temperature for optimum vaporization of the fuel in the various conditioning passages. The fuel supply for the main burners is modulated according to heat requirements in the space that is being heated. Combustible mixture issuing from the main burner ports is ignited by the pilot flame. The aforesaid igniter flame is maintained only long enough to light the pilot flame and to provide an initial heating of the vaporizer block, then is extinguished.

Another feature is the provision of a cylindrical combustion chamber for each main burner so arranged with respect to the vaporizer block that a main burner flame is caused to impinge tangentially against the interior wall of the chamber and is directed in a whirling path around the tubular axis, causing the heavier fuel particles to be completely broken up, promoting efficient and complete combustion of the fuel, and providing for stable burner operation by nature of the design so that the burner is (to a certain extent, at least) self-piloting in action.

Still another feature is the arrangement of heat exchanger tubes in relation to the individual combustion chambers whereby hot combustion products are directed substantially without flame into the heat exchanger tubes. Each combustion chamber itself is in the form of a tube having relatively small dimensions and mounted on the vaporizer block.

Still another feature is the compact arrangement of air intake and exhaust ducts, air plenum chambers for inducing fuel feed and proportioning the admission of air to the various conditioning passages, a combustion air blower assembly which is thin and flat so that it occupies very little space, heat exchangers on either side of the vaporizer block communicating with the burner tubes, and air circulating means disposed in proximity to the heat exchangers.

Still another feature is the mounting of the heat exchangers, burner structure, fuel vaporizing block and fuel feeding package on a tubular supporting member which serves also as an intake air duct for the heater.

Still other features reside in the construction of various components such as the igniter and fuel feeding package, which will be brought out more in detail hereinafter. Numerous other features and advantages will be apparent from a study of the following detailed description taken in connection with the accompanying drawings, wherein:

Fig. 6 is a rear perspective view of the burner assembly of the heater (removed from its case) together with associated parts;

Fig. 7 is a rear elevational view of the vaporizer block;

Fig. 8 is an elevational view of a diffuser or balancing plate adapted to be mounted on the rear of the vaporizer block;

Fig. 9 is a fragmentary front perspective view of the burner assembly, showing the main burner nozzles and the pilot flame baffle mounted on the front of the vaporizer block;

Fig. 10 is a fragmentary front perspective view of the vaporizer block;

Figure 17:
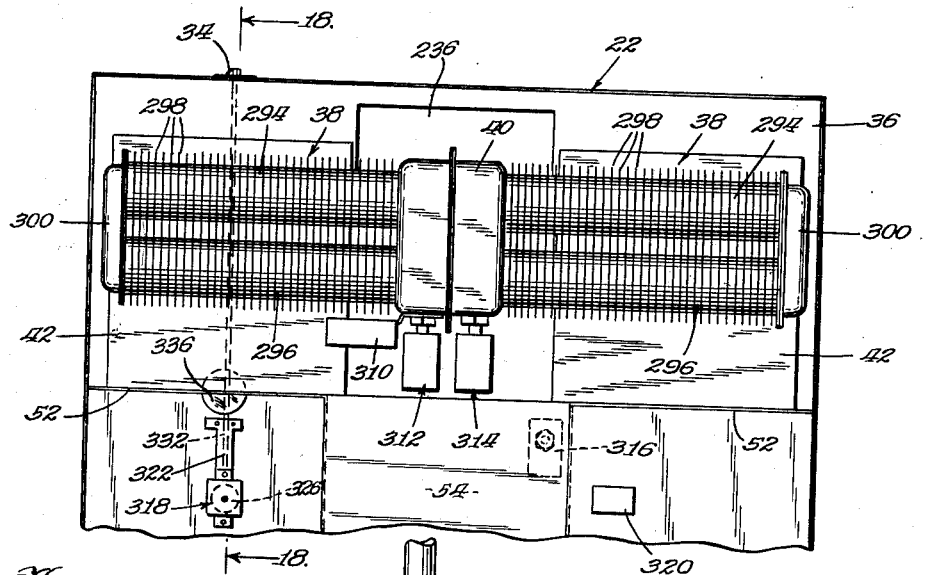
Figure 18:
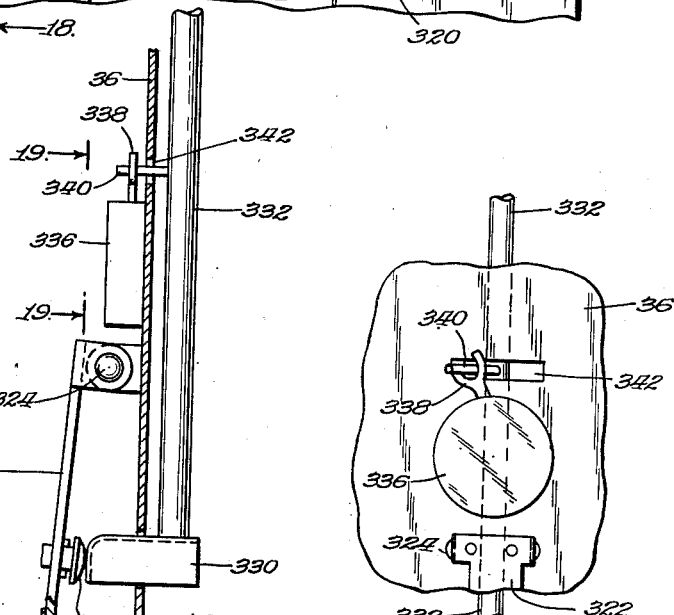
Figure 19:
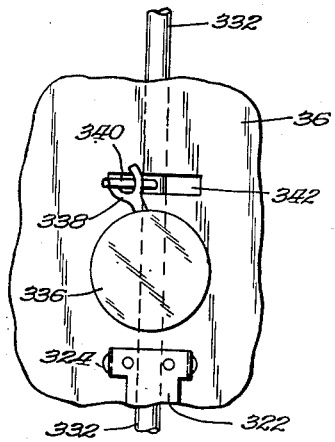

Fig. 15, in the main, is a longitudinal section through the fuel pump and the pressure regulator of the fuel feeding package;

Fig. 16 is a sectional view of a fuel and air manifold, taken on the line 16—16 of Fig. 15;

Fig. 17 is a partial front elevational view of the heater with its housing removed to show the locations of various switches for controlling the operation of the heater;

Fig. 18 is a vertical sectional view on the line 18—18 of Fig. 17;

Fig. 19 is a detail sectional view on the line 19—19 of Fig. 18, showing another switch; and Fig. 20 is a circuit diagram of the heater operating system.

In practicing the invention, the heater is constructed so that it may be mounted on an outside wall of a room. Concentric air intake and exhaust ducts extending through this wall supply fresh combustion air to the heater and lead to the expended combustion products to the outside. The heater has a burner assembly which includes a vaporizer block in which are formed fuel conditioning passages that extend through the interior of the block respectively to the main burners and to the pilot burner. The pilot flame serves the dual purpose of lighting the main burners and heating the vaporizer block. The vaporizer block has sufficient mass so that a substantial quantity of heat from the pilot burner can be temporarily contained therein. This heat is instantly available for transfer to the fuel which is deposited in the conditioning passages. The arrangement is such that the vaporizer block is maintained at an optimum vaporizing temperature by the pilot flame, and the heat from the main burner flame or flames does not appreciably alter the temperature of this block. Air flows into each conditioning passage from a plenum chamber at a predetermined rate for sustaining combustion of the fuel vapor at the burner with which the conditioning passage communicates. This air is intimately mixed with the fuel vapor in the conditioning passage prior to combustion. Secondary air also is introduced to help support combustion at the burners.

The main burners are cut in and out selectively in accordance with heat requirements. This is accomplished by modulating the fuel supply only, leaving the supply of combustion air unaffected. Cutting a main burner in or out does not disturb the desired balance of air and fuel at the other burners, since the fuel conditioning passages and combustion chambers of the various burners are isolated one from another. An electrically operated, fuel-burning igniter is provided to effect an initial heating of the vaporizer block and to light the pilot flame. The igniter has its own electrically heated fuel preheating section for conditioning a combustible fuel and air mixture which is ignited by a hot-wire element.

The burner structure of the heater includes tubular members which respectively serve as combustion chambers for the main burners. These burner tubes direct each main burner flame in a whirling path which insures complete vaporization of the fuel and efficient and stable combustion thereof. The hot products of combustion then are discharged into heat exchanger tubes equipped with fins for transferring the heat to the circulating air. The heat exchanger is in two sections which respectively extend from either side of the case in which the burner assembly is mounted. The combustion products are directed in U-shaped paths, being discharged into the exhaust duct near the point of entry of the fresh combustion air into the heater. There are numerous other features of my improved heater construction which will become more apparent as the description proceeds.

Figures 1, 2:
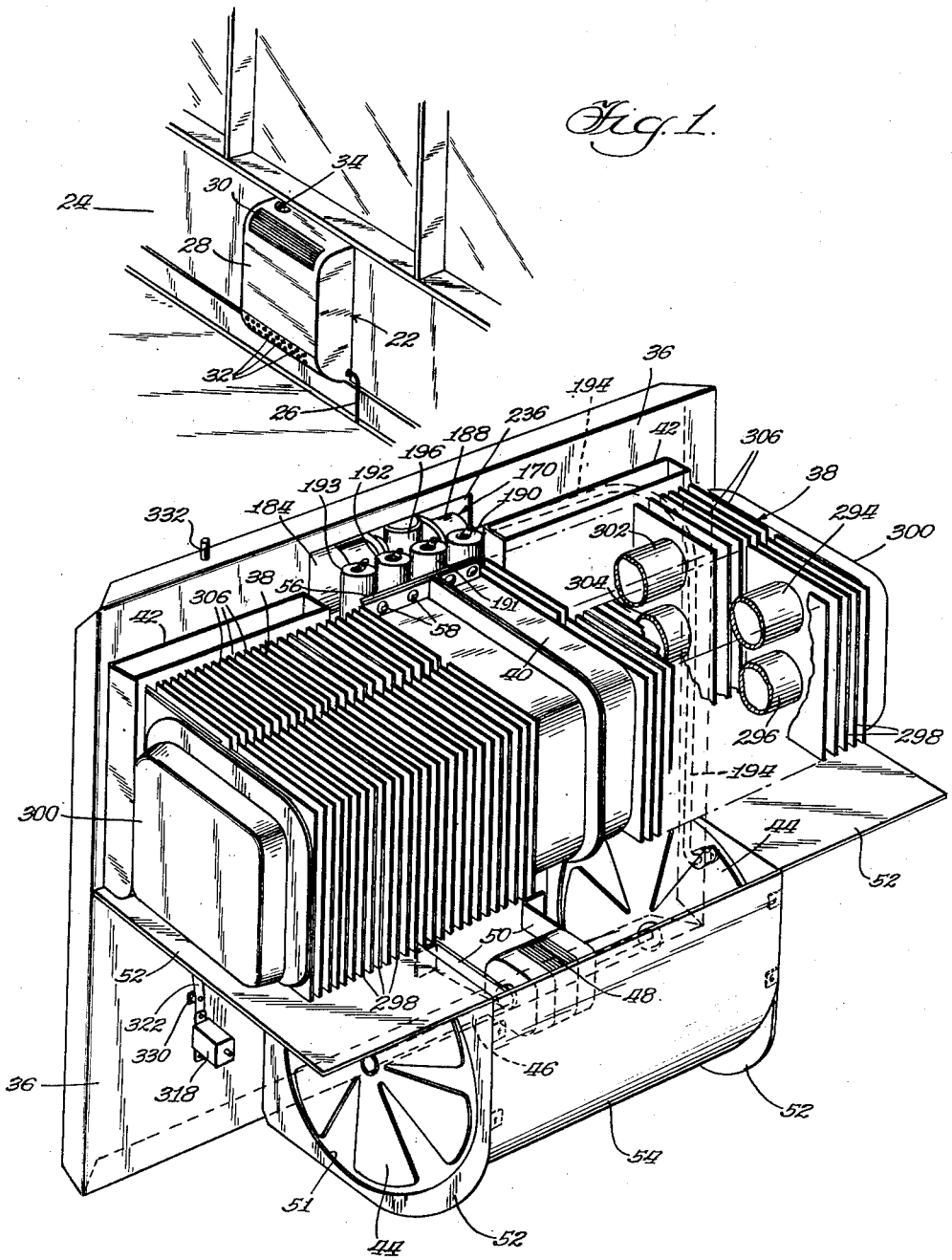
Fig. 1 is a perspective view showing a heater constructed in accordance with and embodying the principles of this invention, the heater being shown mounted on a wall in a room or other enclosure.
Fig. 2 is a front perspective view of the heater with its housing removed, showing parts of the structure broken away for clarity of illustration.

Referring now to Fig. 1, the heater 22 is mounted on the outside wall 24 of a room or enclosure and is supplied with liquid fuel from a concealed storage tank through a pipe or tubing 26. The heater 22 is provided with a suitable housing 28 having openings 32 at the bottom for drawing in air which is to be heated. The heated air is discharged at the top of the heater through suitable discharge openings 30. A control knob 34 on the heater is set in accordance with the air temperature which is desired, and the heater automatically maintains this temperature within close limits.

Referring now to Fig. 2, which presents a general view of the heater with its housing removed, the heater as a whole is mounted on a vertical plate 36 which is attached in any suitable fashion to the wall 24. The heat exchanger is constructed in two sections 38 which are disposed on either side of the burner assembly mounted in the case 40. In back of each heat exchanger section 38 there is disposed a removable can 42 adapted to hold water for humidifying purposes. Beneath the heat exchanger sections 38 are located a pair of air circulating fans 44, Figs. 2 and 3, mounted on a common shaft 46 which is driven by an electric motor 48. The motor 48 is mounted on a bracket 50 secured to the vertical supporting plate 36. The fans 44 are disposed in orifices 51 formed in the downwardly extending portions of angle plates 52 secured to the vertical plate 36. A shroud 54 extends laterally between the vertical portions of the plates 52 to deflect the incoming air toward the fan blades 44. Cool air is drawn in from the bottom of the heater through the openings 32 and is forced upwardly past the heat exchanger sections 38 by the fans 44, then is discharged through the openings 30, Fig. 1, after being heated.

Figure 3:
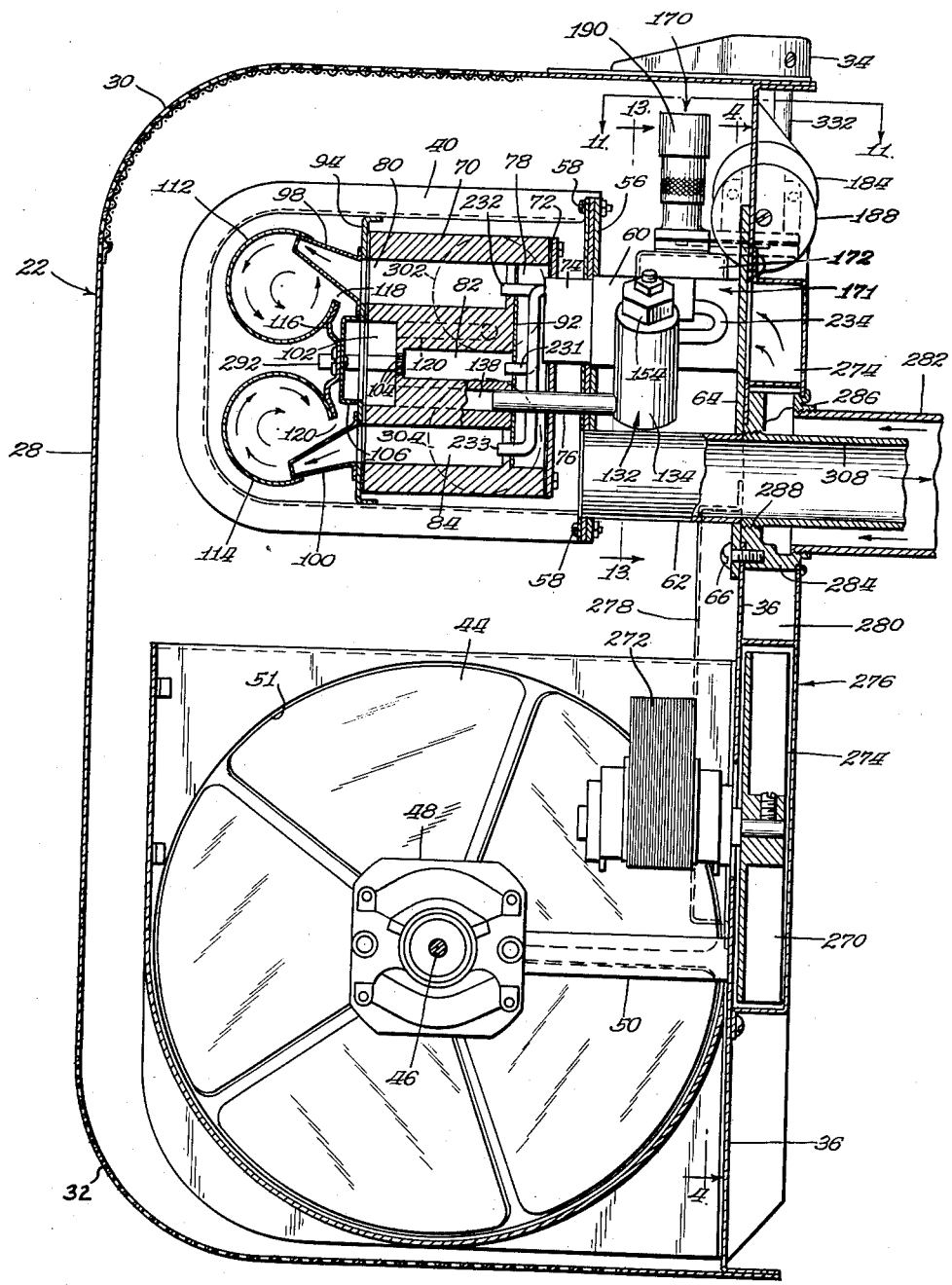
Fig. 3 is a vertical sectional view of the heater shown in Figs. 1 and 2.
Figure 4:
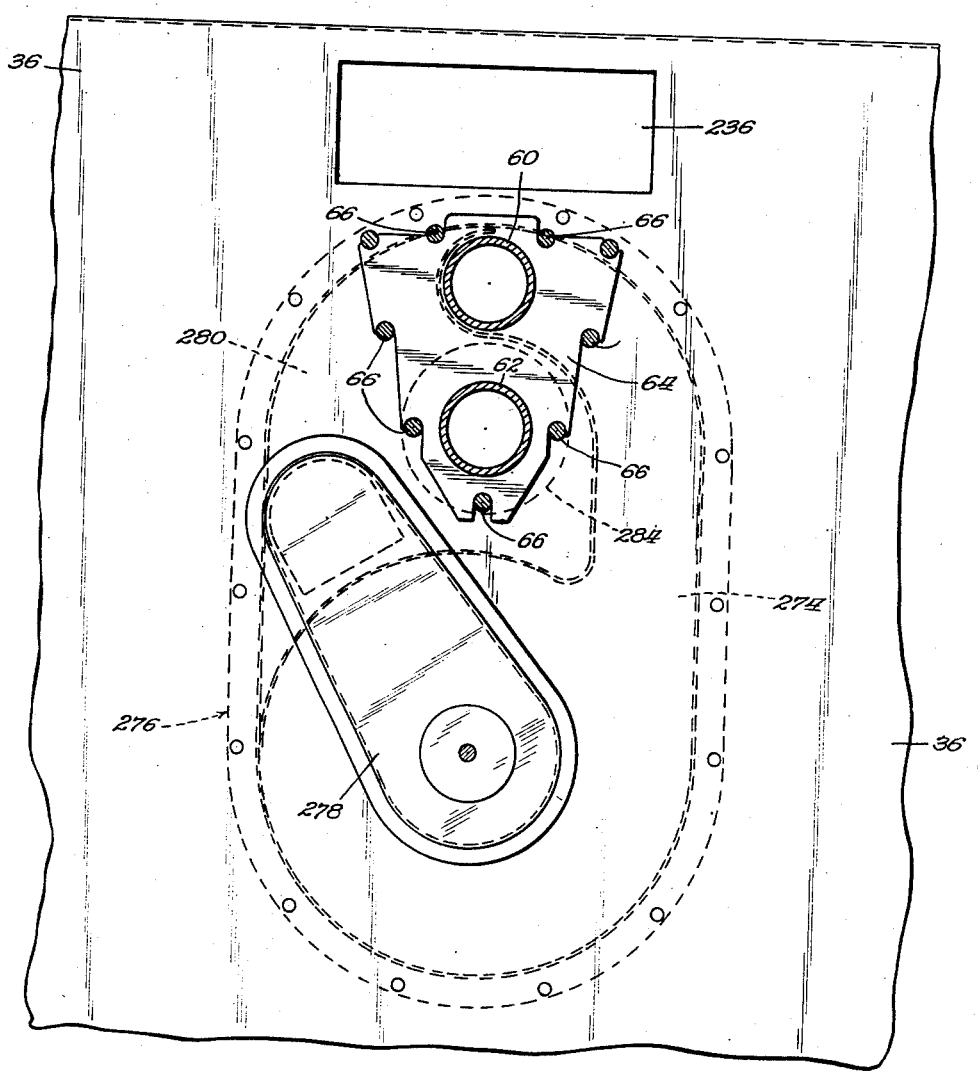
Fig. 4 is a vertical section on the line 4—4 of Fig. 3.

The burner assembly of the heater is enclosed in the case 40, which is permanently secured to the heat exchanger sections 38. The burner case 40 is detachably secured to a back plate 56 by bolts 58 or other suitable fastening devices, Figs. 2 and 3. An air intake duct 60 and an exhaust duct 62, Figs. 3, 4 and 6, are welded or otherwise bonded to the back plate 56 and also to a mounting plate 64 which is disposed adjacent the inner surface of the mounting plate 36. Bolts 66 serve to fasten the mounting plate 64 to the plate 36. The plate 64, through the medium of the ducts 60 and 62, supports the entire burner assembly disposed in the case 40, as well as the heat exchanger sections 38, in horizontally spaced relation to the vertical rear plate 36.

The heart of the burner assembly is the vaporizer block 70, Figs. 3, 6, 7 and 10. This vaporizer block is an integral body of metal, preferably cast aluminum, which is bolted to a gasketed plate 72 (Fig. 3) that is connected by tubes 74 and 76 to the back plate 56 of the burner assembly. The functions of the tubes 74 and 76 will be explained more fully hereinafter. For the present it will be noted merely that they serve to support the vaporizer block 70 in the position shown.

Figure 5:
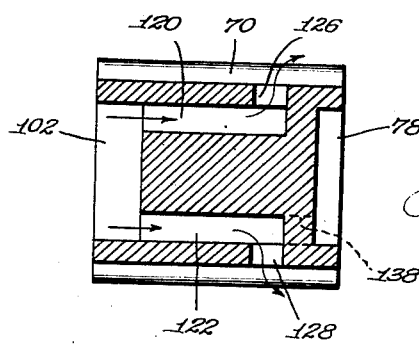
Fig. 5 is a horizontal section of the vaporizer block taken on the line 5—5 of Fig. 7.
Figure 11:
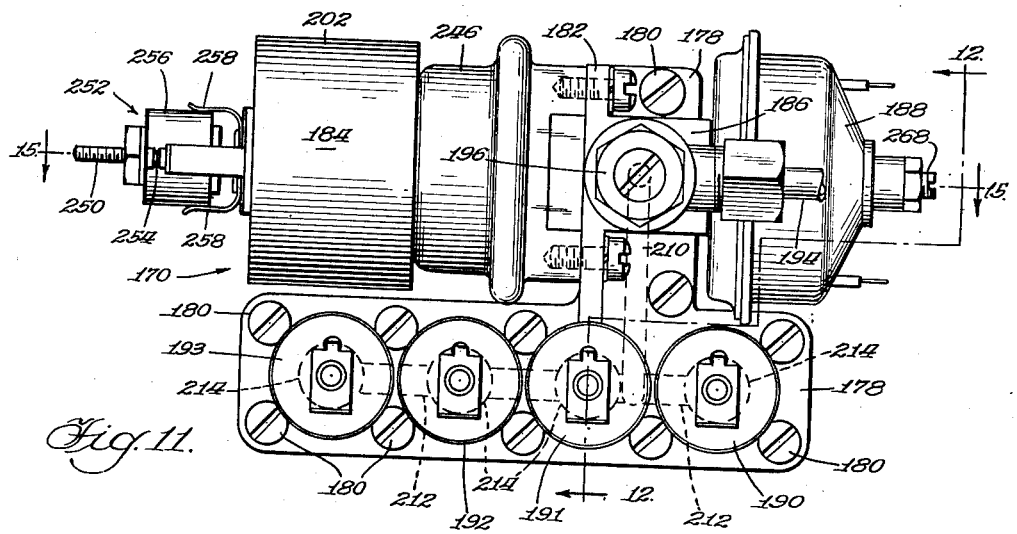
Fig. 11 is a plan view of the fuel feeding package, taken on the line 11—11 of Fig. 3.

The rear portion of the block 70 is recessed, as indicated at 78, Figs. 3, 5 and 7, to afford a plenum chamber. Communicating with this plenum chamber are three fuel conditioning passages 80, 82 and 84 which extend horizontally through the interior of the vaporizer block 70 from rear to front thereof. Combustion air is supplied to the plenum chamber 78 through the air intake duct 60 and the air tube 74, which communicates with the duct 60. From the chamber 78 the air is distributed to the passages 80, 82 and 84 through sets of openings 86, 88 and 90 respectively (Fig. 8) formed in a diffuser or balancing plate 92 disposed in the chamber 78. The balancing plate 92 insures that air will be admitted to the passages 80, 82 and 84 in the correct proportions.

Fuel is deposited in the passages 80, 82 and 84 to be vaporized therein, as will be explained in greater detail subsequently, and the fuel vapor is mixed with the air in each of these passages to form a combustible mixture. The passages 80 and 84 supply the combustible mixtures to the main burners of the heater, while the passage 82 supplies combustible mixture to the pilot burner. All of these passages are rectangular in cross section with flat, horizontal bottom surfaces on which the fuel is deposited to spread in a thin film thereover and become vaporized. The vaporizing surfaces are shown in the drawing as being smooth, but they may be corrugated or grooved if desired. It will be noted that the fuel conditioning passages have walls of substantial thickness or depth within the vaporizer block 70.

The burners themselves are shown best in Figs. 3 and 9. A rectangular front plate 94, having flanged edges which engage the interior of the burner case 40 on all sides thereof, is secured by screws 96 to the front of the vaporizer block 70. Projecting diagonally forward in diverging fashion from the plate 94 are the upper and lower main burner nozzles 98 and 100, respectively. The plate 94 is suitably gasketed to prevent leakage. The nozzles 98 and 100 communicate through openings in the plate 94 with the forward ends of the fuel conditioning passages 80 and 84.

The pilot burner comprises a central rectangular port or recess 102 and a baffle 106 at the front of the vaporizer block 70. A thin partition intervenes between the recess 102 and the fuel conditioning passage 82, and perforations 104, Figs. 3, 7 and 10 extend through this partition. This perforated partition prevents the pilot flame from backing up into the fuel conditioning passage 82. The baffle 106 is mounted on the front plate 94 intermediate the nozzles 98 and 100 by a pair of the screws 96 (Fig. 9). This baffle 106 forms a combustion chamber for the pilot flame, and the flame circulates within this chamber with a sort of self-piloting action so that the flame is not blown away from the fuel port 102. Openings 108 and 110 in the baffle 106 allow portions of the pilot flame to spread toward the main burner nozzles 98 and 100.

Each main burner has an individual combustion chamber consisting of a short length of tubing 112 or 114, open at both ends, which is disposed so that the main burner flame issuing from the nozzle 98 or 100 is caused to travel in a whirling path inside of this tube. The tubes 112 and 114 are supported in the front part of the burner case 40 by a spider 116 (Fig. 3), permanently bonded to these tubes, which is attached by screws to the baffle 106. The axes of the tubular combustion chambers 112 and 114 are disposed transversely of the fuel conditioning passages 80 and 84, and the nozzles 98 and 100 extend through openings 118 and 120 in these tubes to terminate in tangential relationship with the interior walls of the tubes. The openings 118 and 120 are sufficiently large so that portions of the pilot flame can be drawn into the interior of each tube by aspirating action. The tubes 112 and 114 are made of suitable flame-resistant material (such as the nickel-chrome alloy sold under the trade-name "Iconel") and may, if desired, be coated with a ceramic cement. The tubular combustion chambers for the main burners (112 and 114) have what may be termed a self-piloting effect, that is, they cause the flames to stay close to the main burner nozzles 98 and 100 instead of separating therefrom, as might otherwise occur. Hence, they reduce the possibility of accidental extinguishment.

Referring now to Figs. 3, 5, 7 and 10, the vaporizer block 70 is provided with three additional interior passages 120, 122 and 124 which respectively extend from the pilot flame opening 102 rearwardly through the block for a limited distance, terminating in spaced relation to the plenum chamber 78. Small transverse apertures 126, 128 and 130 in the side of the block 70 respectively communicate with the inner ends of the passages 120, 122 and 124. As explained previously, only a portion of the pilot flame escapes through the holes in the baffle 106 for igniting the main burner fuel. The remaining portions of the pilot flame (or the combustion products therefrom) are forced rearwardly through the passages 120, 122 and 124 and escape through the openings 126, 128 and 130 to the exhaust space surrounding the block 70. The path of the pilot flame jets through the block 70 is indicated by the arrows in Fig. 5. The pilot flame thus serves to heat the vaporizer block 70, and it maintains the block 70 substantially at a constant temperature for optimum vaporization of the liquid fuel in the conditioning passages 80, 82 and 84. On the other hand, the main burners do not appreciably affect the temperature of the block 70, because of the low heat conductivity of the thin metallic connections between these parts (except to compensate for the cooling effect of the fuel).

When the heater is initially placed in operation from a cold condition, an ignition means is employed for warming the vaporizer block 70 and lighting the pilot flame. Referring to Figs. 3, 6, 13 and 14, the igniter 132 has a hollow cylindrical body or housing 134 that is connected near its lower end by the aforesaid tube 76 to a horizontal passage 138, Figs. 3, 7 and 10, that extends entirely through the vaporizer block 70 from the plenum chamber 78 to the pilot flame port or opening 102. The tube 76 and another tube 234 (mentioned hereinafter) serve to support the igniter housing 134 in the position shown in the drawing.

Centrally disposed within the igniter housing 134 is a metal tube 140, within which is mounted a coiled hot-wire element 142. The element 142 is formed out of bare resistance wire such as Nichrome. One end of the wire 142 is welded to the open end of the tube 140, as indicated at 144. The other end of the wire 142 is secured to a stud 146 that extends through the upper end of an insulating liner 148 in the upper end of the tube 140. A brass ring 150 surrounds and is secured to the upper end of the tube 140 and to the liner 148, and this ring 150 is press-fitted or otherwise secured to the inside of an internally threaded mounting nut 152. The outer threaded end of the terminal stud 146 receives a nut 154 which is insulated from the mounting nut 152 by an insulating washer 156. An externally threaded bushing 158 is secured to the upper end of the hollow igniter body 134.

The tube 140, wire 142, liner 148, terminal stud 146, nut 154, ring 150 and nut 152 constitute a unit which is insertable in and removable from the igniter housing 134. The nut 152 is threaded onto the bushing 158 for securing this unit in the position shown in Fig. 14. An electrical connection (not shown) is made to the exposed portion of the terminal stud 146 and is completed through the wire 142, which is grounded at 144 to the metal frame of the igniter.

Liquid fuel and air are delivered to the annular space surrounding the tube 140 in a manner which will be explained hereinafter. The upper portion of the wire 142 has a number of rather widely spaced turns which serve to heat the upper portion of the tube 140 to a temperature sufficient for vaporizing the fuel so that it will mix readily with the incoming air. The mixture of fuel vapor and air is funneled through a tubular sleeve 160 having flared ends which are secured inisde the igniter housing 134 closely adjacent to, but spaced from, the lower portion of the tube 140. For the purpose of elongating the path that must be travelled by the fuel and air and thus insure complete vaporization, a thick wire 162 is spirally wound on the exterior surface of the tube 140, to which it is secured. The fuel and air mixture therefore travels in a spiral path through the space between the tube 140 and the sleeve 160, so that the fuel is thoroughly heated, vaporized and mixed with the air to form a combustible mixture.

The combustible mixture emerges through an opening 164 (Fig. 14) in a washer or flange 166, striking the bottom of the igniter housing 134, and part of the mixture whirls about into contact with the lower end of the wire igniter element 142. The turns at the lower end of the element 142 are closely spaced together, and are heated to incandescence by the electric current passing through them, so that the combustible mixture is readily ignited upon coming into contact with the igniter element 142. The igniter flame then is forced out through the tube 76 and through the passage 138 of the vaporizer block 70, emerging into the space 102 at the front of the block 70 and striking the baffle 106.

The igniter flame serves to light the combustible mixture issuing through the perforations 104 from the pilot fuel conditioning passage 82 in the block 70, thereby establishing the pilot flame. The igniter flame also supplies a certain initial heating of the block 70 as it travels through the passage 138 in the block 70, and as portions of the igniter flame (or combustion products therefrom) pass backwardly through the passages 120, 122 and 124 in the block 70. The flame passages 120, 122, 124 and 138 are in sufficiently close proximity to the fuel conditioning passages 80, 82 and 84 so that very rapid heating of the walls of the latter passages takes place, even under extremely cold ambient conditions.

The delivery of the liquid fuel to the heater is controlled by a fuel feeding assembly 170, Figs. 3, 6, 11, 12, 13 and 15, which is mounted on a manifold structure 171 secured to the air intake duct 60 rearwardly of the back plate 56 of the burner assembly. A frame member 172 of the manifold structure 171 is secured to a base or body 174 which is seated on and welded to the duct 60.

Mounted on top of the frame 172 are a lower plate 176 and an upper plate or body 178, between which a gasket is inserted. The plates 176 and 178 are secured together by screws 180 that are threaded into the member 172. The upper plate or body 178 has vertically extending ears 182 (Figs. 3 and 11) which support an electric solenoid pump 184, and a post or block 186 (Figs. 11 and 15) on which a fuel pressure regulator 188 is mounted. Also mounted on the upper plate 178 of the fuel feeding assembly is a row of four solenoids 190, 191, 192 and 193. The solenoids control the flow of fuel to the igniter, pilot burner and main burners of the heater.

Structural details of the means for handling the liquid fuel, including the fuel feeding assembly 170, are fully illustrated in the drawings and will be described herein to the extent necessary for an adequate understanding of the invention. Liquid fuel is drawn from the storage tank or other supply source through the pipe 26, Fig. 1, and passes through a fuel line 194, Fig. 2, into a fitting 196, Fig. 15, mounted in the post 186. Assuming that the pump 184 is operating, the diaphragm 198 is caused to oscillate by a reciprocatory plunger 200 of the solenoid 202. As the diaphragm 198 is retracted, liquid fuel is drawn past the check valve 204 into the fuel chamber 206 in the pump 184. Then as the diaphragm 198 moves forwardly, fuel is discharged from the chamber 206 past a check valve 208 into a pressure-regulating reservoir 260 (described hereinafter) and into a fuel passage 210, Figs. 11, 12 and 15, which leads to a cross passage 212, Figs. 11 and 13, in the lower plate 176. The passage 212 interconnects a series of wells 214 in the lower plate 176 which are respectively located beneath the solenoids 190, 191, 192 and 193. Fuel therefor is supplied through the passages 210 and 212 to the various wells 214.

Figure 12:
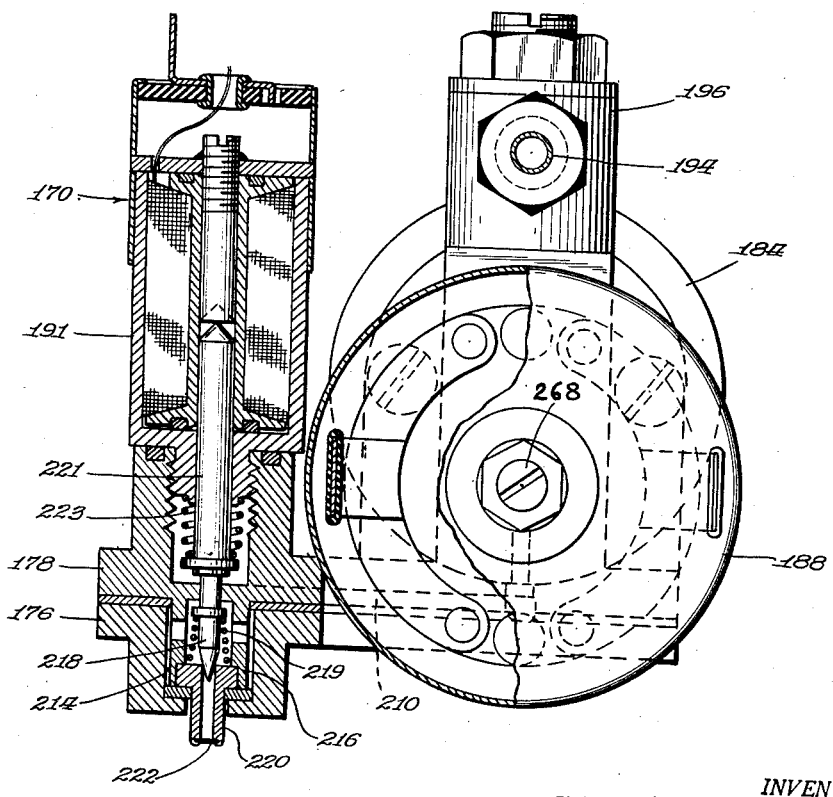
Fig. 12 is a vertical section on the line 12—12 of Fig. 11.

In each of the fuel wells 214 is disposed a hollow boss 216, Fig. 12, which depends from the upper plate 178. Within each boss 216 is disposed a needle valve 218 which is controlled by a solenoid as 191, for example.

The interior of the boss 216 communicates with the well 214 so that fuel is admitted to the space surrounding each needle valve 218. Each of the valves 218 is associated with the upper end of a nipple 220 which depends from the bottom of the well 214 below the lower plate 176. A small coil spring 219 tends to lift the valve 218 off of the nipple 220. Normally, however, the plunger 221 of the solenoid is pressed downwardly by a stronger spring 223, causing the valve 218 to be seated on the nipple 220. When the solenoid as 191, Fig. 12, is energized, the plunger 221 is retracted, and the needle 218 is raised by its spring 219, allowing fuel to flow through the nipple 220 and through an orifice plate 222 in the lower end of this nipple.

Figure 13:
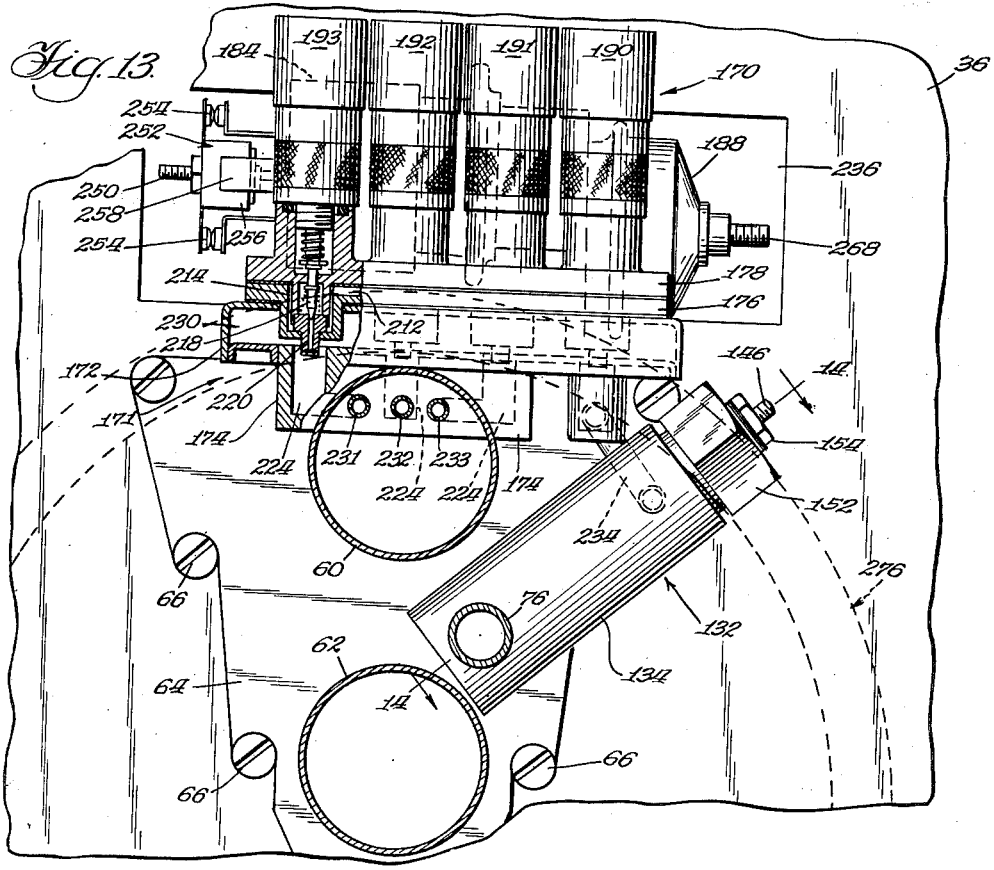
Fig. 13 is a vertical sectional view taken on the line 13—13 of Fig. 3, showing the fuel feeding package and the electric igniter unit in elevation, certain portions of the structure being broken away to illustrate otherwise concealed details.

Liquid fuel flowing through each of the three valves 218 which are controlled by the main burner and pilot burner solenoids 191, 192 and 193 passes into one of three fuel passages 224 in the base 174 of the manifold structure 171, Figs. 13 and 16. A portion of the base or body 174 is disposed within the intake air duct 60 (see also Fig. 15). Incoming air flowing through the duct 60 enters a passage 228 in the rear of the manifold body 174. A partition 226 (Fig. 16) in this portion of the body 174 directs the air upwardly from the passage 228 into a small plenum chamber 230, Fig. 13, within the frame 172 of the manifold structure 171. The air then flows into the passages 224, which are considerably larger in diameter than the nipples 220, and by aspirating action draws fuel from the nipples 220 into the respective passages 224 (provided, of course, that the needle valves 218 are open). The forward ends of the passages 224 communicate respectively with fuel lines 231, 232 and 233 which lead respectively through holes 225, 227 and 229 (Fig. 8) in the balancing plate 92 to the various fuel conditioning passages comprising the pilot fuel conditioning passage 82 (Fig. 3), the upper main burner fuel conditioning passage 80 and the lower main burner fuel conditioning passage 84. The action of these aspirators is such that liquid fuel is drawn into the fuel lines and is "bubbled" through these lines to the fuel conditioning passages leading to the burners.

Figure 14:
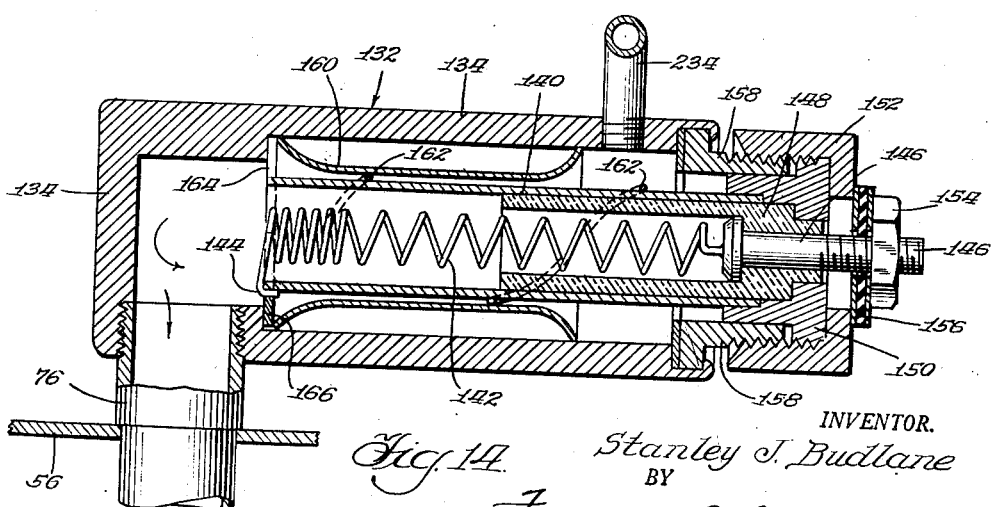
Fig. 14 is a longitudinal section through the electric igniter unit taken on the line 14—14 of Fig. 13.

In similar fashion, fuel flowing through the valve 218 controlled by the igniter fuel solenoid 190 is drawn by aspirating action into a tube 234, Figs. 3, 13 and 14, that leads from the plenum chamber 230 to the interior of the igniter housing 134. In this manner, the fuel is supplied to the igniter 132 under control of the solenoid 190.

A cut-out 236 in the rear mounting plate 36, Figs. 4 and 13, provides clearance for the fuel pump 184 and the pressure regulator 188. Referring now to Fig. 15, the solenoid 202 of the pump 184 has a housing 238 from the base of which projects an externally threaded collar portion 240, in which the plunger 200 is guided. The plunger 200 normally is maintained in spaced relation to the stationary pole piece 242 by a spring 244 disposed within the diaphragm housing 246. The diaphragm housing 246 is mounted on an internally threaded retaining member or nut 248 which is screwed onto the collar 240. If adjustment of the air gap between the plunger 200 and pole piece 242 is desired, a convenient way of doing this is to insert shims between the base of the solenoid housing 238 and the cooperating end of the nut 248 (or the diaphragm housing 246) before the collar 240 and nut 248 are tightened.

A bolt 250 extends from the plunger 200 through the pole piece 242 and has a slip friction connection 252 with contacts 254 mounted on the outside of the solenoid housing 238. The solenoid 202 cannot be energized unless the contacts 254 are engaged. When the solenoid 202 is energized, the plunger 200 is retracted from the position shown in Fig. 15 toward the pole piece 242, thereby actuating the diaphragm 198 to draw a charge of fuel into the chamber 206. Due to the slip friction connection, the contacts 254 are not disengaged until the plunger 200 nears the end of its rearward stroke. The circuit to the solenoid 202 then is broken, and the spring 244 restores the plunger 200 causing the diaphragm 198 to force the fuel from the chamber 206. The contacts 254 do not again engage each other until the plunger 200 is almost fully restored. The slip friction connection 252 includes a rubber ring 256 having a lost-motion connection with the bolt 250 and frictionally clamped between a pair of spring fingers 258 secured to the solenoid 202. The spring fingers 258, by virtue of their frictional grip on the rubber body 256, retard the opening and closing of the contacts 254 in the manner just described. This insures a full stroke of the plunger 200 in each direction for maximum working efficiency of the pump 184.

The fuel pressure regulator 188, Fig. 15, has a fuel chamber 260 which is in constant communication with the fuel passage 210. The spring-loaded diaphragm 262 of the regulator 188 is arranged to actuate contacts 264. The tension of the spring 266 is adjusted by a screw 268. When the fuel pressure in the passage 210 exceeds a predetermined value, the contacts 264 are opened, preventing a circuit from being closed to the solenoid 202, regardless of whether or not the contacts 254 are closed. The pump circuit remains interrupted until the fuel pressure drops below a given value. The chamber 260 serves to cushion the pressure pulsations of the pump 184. The bulk of each new charge of fuel is delivered first to the chamber 260, which functions as a reservoir. The spring 266 yields to accommodate the charge, then gradually forces the fuel into the passage 210 after the power stroke of the pump has ended.

For supplying combustion air to the burners, there is mounted on the back of the supporting plate 36 a fan or blower 270 which is powered by a small electric motor 272 located forwardly of the plate 36. A scroll 274, Figs. 3 and 4, which is part of the blower housing 276, surrounds the fan 270 and communicates with the inlet end of the air duct 60. Air is admitted to the interior of the scroll 274 by means of a duct 278 extending diagonally for a short distance across the front of the mounting plate 36. This duct 278 communicates at its opposite ends respectively through openings in the plate 36 with the central portion of the space surrounding the fan 270 and with the space 280 within the blower housing 276 exclusive of the scroll 274. Air is supplied to the space 280 by an air inlet pipe 282 which extends through the wall of the building to the outside. A hollow bushing 284 secured in the blower housing 276 has laterally spaced, coaxial, internally threaded portions 286 and 288. The air inlet pipe 282 is threaded at its inner end into the portion 286 having the larger diameter. Through openings in the bushing 284, air is drawn from the pipe 282 into the space 280, thence through the passage or duct 278 into the scroll 274 by action of the fan 270. The air then is impelled by the fan 270 through the scroll 274 to the air intake duct 60 that supplies air to the plenum chamber 78 in the vaporizer block 70 and to the auxiliary plenum chamber 230 in the fuel and air manifold 171.

Supplemental or secondary air, which insures complete combustion of the fuel, is supplied through horizontal passages 290, Fig. 7, in the vaporizer block 70. These passages 290 extend from the plenum chamber 78 to the recess 102, Figs. 3 and 10, in the front of the block 70. Short tubes 292 are fitted into the front ends of the passages 290 and project from the block 70 through the baffle 106, as shown in Fig. 9. These tubes 292 discharge fresh air into the space within the burner case 40 forwardly of the front plate 94, thereby insuring an abundant supply of such additional air as may be required for complete combustion of the fuel within the combustion chambers or burner tubes 112 and 114.

Referring to Figs. 2 and 17, heat exchanger tubes 294 and 296 in the heat exchanger sections 38 respectively communicate with the opposite open ends of the burner tubes 112 and 114. That is to say, the combustion products from the burner tube 112 are discharged laterally at both ends thereof into the heat exchanger tubes 294 in the two sections 38, and likewise, combustion products from the tube 114 are discharged into the two tubes 296 in the sections 38. The arrangement is such that substantially complete combustion takes place within the burner tubes 112 and 114, so that only the hot combustion products (substantially without flames) pass into the heat exchanger tubes 294 and 296. The tubes 294 and 296 are provided with heat conducting fins 298. The heat exchanger tubes are made of suitable heat-resistant material such as cold-rolled steel coated with a ceramic compound, and the fins 298 are of copper or other highly heat-conductive material. Preferably the fins are bonded to the heat exchanger tubes in a single brazing operation by neutral-atmosphere heating and the tubes 294 and 296 are permanently bonded to the sides of the burner case 40.

The outlet ends of the heat exchanger tubes 294 and 296 communicate through headers 300 with the inlet ends of heat exchanger tubes 302 and 304 (of which there are a pair in each heat exchanger section 38) which extend respectively from the headers 300 back toward the burner case 40, to which they are bonded. The tubes 302 and 304, like the tubes 294 and 296, are provided with heat-conductive fins 306.

The space within the burner case 40 surrounding the vaporizer block 70 to the rear of the front plate 94 communicates with the outlet ends of the heat exchanger tubes 302 and 304 and with the inlet end of the exhaust duct 62. The exhaust duct 62 in turn communicates with an exhaust pipe 308 which extends concentrically through the interior of the air inlet pipe 282 to the exterior of the building. The exhaust pipe 308 has a threaded end which is screwed into the smaller of the internally threaded portions 288 of the bushing 284. The body of fresh incoming air passing through the pipe 282 protects the wall of the building from the hot exhaust gases in the pipe 308. If these pipes are of any substantial length, a certain amount of preheating will be imparted to the incoming air by the exhaust pipe 308, thereby aiding the fuel vaporization process.

Various automatic controls are included in the heater 22 for regulating its operation. The approximate locations of these control devices are indicated in Fig. 17. Thus, beneath the burner case 40 there are located three thermostatic switches comprising a sweepout switch 310, an igniter cut-out switch 312 and a pilot switch 314. In a relatively cool location on the heater, such as the back of the mounting plate 36, there is located an electrothermal switch 316. A thermal temperature control device 318 and an overheat safety switch 320 are located in the inlet air stream of the heater. The functions of these various switches and control devices will be described more fully in connection with Fig. 20 hereinafter.

The temperature control device 318, as shown in Fig. 18, is mounted on a lever 322 which is pivoted to the mounting plates 36 and 324. The lever 322 depends from the pivot 324, and on the lower end of this lever there is mounted a bellows unit 326 filled with a thermally expansible fluid. The device 318 operates a switching apparatus 328 according to the thermal expansion and contraction of the bellows 326 in response to air temperature. The device 318 maintains a substantially uniform temperature of the air by controlling the operation of the main burners of the heater.

In order to set the device 318 for maintaining a given air temperature, there is provided a control cam 330 mounted on the lower end of an operating shaft 332 that extends vertically in back of the mounting plate 36, on which it is journaled. The shaft 332 is actuated by the control knob 34, Figs. 1, 3 and 17, to position the cam 330 selectively. A cam follower 334 on the lever 322 cooperates with the cam 330 for swinging the lever 322 inwardly or outwardly as the position of the cam 330 is changed.

An on-off switch 336, Figs. 18 and 19, is mounted on the front of the mounting plate 36. The forked actuating arm 338 of the switch 336 straddles a pin 340 secured in the shaft 332, this pin extending through a clearance opening 342 in the plate 36. When the control knob 34 is turned to its "off" position, the switch 336 is snapped off, thereby shutting down the heater. When the heater is to be started again, the control knob 34 is turned to a desired temperature-selecting position, automatically snapping the switch 336 on.

The operation of the heater will be described with reference to the circuit diagram, Fig. 20. To turn the heater on, the switch 336 is closed, establishing a circuit from the power supply line through a thermal limit switch 338 in the control device 318, thence through the "cold" contacts of the sweepout switch 310 to the motors 48 and 272, which respectively circulate the room air and supply combustion air to the burners.

Assuming that the overheat switch 320 is in its closed position, a circuit also is extended to the primary winding 340 of a step-down transformer 342. A secondary winding 344 on the transformer 342 is connected to the input terminals of a rectifier bridge network comprising the sections 345, 346, 347 and 348 of the rectifier 349. The rectifier 349, upon being excited, supplies direct-current potential to the thermal switches 312, 314 and 316 and to the pressure regulator 188.

If the pressure regulator contacts 264 are closed, circuit is continued through the solenoid 202 of the fuel pump 184 and through the switch contacts 254 of the pump 184 to ground. The pump 184 thereupon starts operating, and the solenoid 202 is alternately energized and deenergized by the closing and opening of the contacts 254 and 264 as described hereinabove. In order to prevent arcing of the contacts 254, a connection 356 is extended from the junction of the solenoid 202 and the contacts 254 back to a rectifier section 358 in the rectifier 349. The section 358 shunts the contacts 254 insofar as any inductive discharge from the solenoid winding 202 is concerned. The pump contacts 254 and the pressure regulator contacts 264 operate in timed relation with each other. The contacts 254 open first; then the contacts 264 open as the pump starts its forward or working stroke. The contacts 254 close at the end of this stroke, and thereafter the contacts 264 close as the fuel pressure subsides.

The igniter cut-out switch 312 being cold, the igniter contacts 360 thereof are closed, whereas the main burner contacts 362 thereof are open. A circuit is extended from a secondary winding 364 of the transformer 342 through the contacts 360 and through a resistance winding 366 on the electrothermal switch 316 to the hot-wire element 142 of the igniter. The element 142 is heated to incandescence by the alternating current which flows through it. Likewise, the current passing through the resistance winding 366 heats the thermal element of the switch 316, thereby causing the switch 316 to close its contacts so that a circuit is established from the direct-current line through switch 316 to the igniter fuel valve solenoid 190. However, if the igniter element 142 should be burned out or otherwise defective so that no current passes through it, the switch 316 remains open, and none of the fuel valves is permitted to open under these circumstances.

Fuel being supplied to the igniter 132, an igniter flame is produced and is projected through the vaporizer block 70. Passage of the igniter flame through the block 70 heats the block, causing the pilot switch 314 to close. This establishes a circuit from the direct-current line to the pilot fuel valve solenoid 193, which energizes and opens the valve to the pilot fuel line. Due to the initial heating of the vaporizer block, the pilot fuel is properly conditioned for combustion, and a pilot flame is established when this fuel mixture contacts the igniter flame.

Heating of the vaporizer block 70 is continued by the pilot flame, and when the block attains a predetermined temperature, the igniter cut-out switch 312 changes from its "cold" position to its "hot" position. Contacts 360 thereupon open and interrupt the circuit to the igniter element 142 and also to the resistance winding 366 of the switch 316. Switch 316 thereupon opens and breaks the circuit to the igniter fuel valve solenoid 190, causing the igniter fuel valve to close. Thus, operation of the igniter is discontinued when the pilot flame has been established. The pilot switch 314 remains closed so long as the vaporizer block is heated.

The sweepout switch 310 (which is a snap-action thermal switch) changes from its "cold" to its "hot" position as the heater temperature rises. This establishes a circuit through the "hot" contacts of the switch 310 to the motors 48 and 272 for maintaining these motors in operation independently of the switch 336. The purpose of this is to allow a scavenging operation to take place after the heater is switched off, whereby the motor 272 continues to draw fresh air through the combustion chambers of the heater for a limited interval. This serves to cool the heater off rapidly and to clear the combustion chambers and heat exchanger of fuel vapor and combustion products.

When the "hot" contacts 362 of the thermal switch 312 close, a circuit is tentatively established to the temperature control switch 328. The switch 328 has contacts 370 and 372 which are respectively arranged to close at different temperatures. If, for example, the air temperature is abnormally low so that a large quantity of heat is demanded, the position of the switch 328 is such that both of the contacts 370 and 372 are closed. Circuit then is extended from the direct-current line through the contacts 362 of the switch 312 and thence through the contacts 370 and 372 of the switch 328 to the main burner fuel valve solenoids 191 and 192. Both of the main burner fuel valves therefore are opened, and fuel is delivered to the conditioning passages 80 and 84 in the vaporizer block 70. Combustible mixture is supplied to both the main burners under these conditions.

If the air temperature is such that only a moderate amount of heat is demanded, the switch 328 will assume a position such that only the contacts 370, for example, will be closed. In this situation the solenoid 192 is energized and the solenoid 191 is not energized. Thus, only one of the main burners is supplied with fuel. By means of the balancing plate 92, Fig. 8, the supply of air to each of the fuel conditioning passages in the vaporizer block 70 is proportioned so that the various burners are self-sustaining. That is, the operation of one burner is not affected by the fact that another burner is idle. The excess combustion air flowing through an idle burner serves merely to dilute the exhaust gases at the headers 300 without affecting combustion at the other burners. If no heat or only a minimum quantity of heat is demanded, both of the contacts 370 and 372 remain open, so that heat is supplied solely by the pilot burner.

From the foregoing description it is apparent that the temperature control device 318 operates to modulate the main burners of the heater, by selectively opening and closing the main burner fuel valves in accordance with heat requirements. This is designed to maintain the air temperature within relatively close limits at the selected value. If, for some reason, the air temperature should rise more than three degrees above the temperature setting, the limit switch 338 opens and interrupts the energizing circuit for the transformer 342, thereby preventing the delivery of fuel to the heater until the temperature is reduced sufficiently to bring about closure of the switch 338.

If there should be a failure of combustion such as might be caused, for example, by accidental extinguishment of the pilot flame, the heater cools and the thermal switch 312 changes from its "hot" position to its "cold" position. The contact 362 therefore opens and interrupts the circuit to the main burner valve solenoids 191 and 192. The contacts 360 close, thereby resulting in the energization of the igniter element 142 and the igniter fuel valve solenoid 190. The pilot switch 314 may be designed to remain closed until the heater has cooled to a considerably lower temperature, or it may open concurrently with opening of the main burner contacts 362, as preferred. Assuming that the condition which caused failure of combustion was not a permanent one, the igniter element 142 will reestablish combustion, causing the above described sequence of operations to be repeated. A conventional timing switch (not shown) may be incorporated in the control system to shut down the heater in the event ignition cannot be established.

If the air circulating fan motor 48 should fail, or the air stream should be obstructed (as would occur if someone should place a towel or the like over the opening 30, Fig. 1, of the heater) the temperature of the heater structure may become dangerously high. Under conditions such as these, the overheat switch 320 snaps open and interrupts the circuit to the transformer 342. The feeding of fuel to the heater is stopped and cannot be resumed until the dangerous condition which produced overheating is removed. The overheat switch 320 must be manually reset in order to place the heater in operation again.

Summarizing the advantages of my invention, I have provided a liquid fuel-consuming air heater which can be more successfully employed in small and medium-sized installations than either the pot type or the atomizing type of burner. The efficiency of this heater is far greater than that of the pot type burner and is at least equal to that of an atomizing burner having the same capacity. My heater is considerably smaller in size and cheaper for the same thermal output than either of the other types mentioned. The combustion chambers are small, and the power requirements are light.

The vaporizer block and associated parts of the burner assembly are very compact. In a commercial model of the invention, capable of delivering 40,000 B. t. u. or more per minute, the block 70 measures approximately four inches high, two and one-half inches wide and three inches long. Yet, there is a sufficient depth of metal in the walls of the fuel conditioning passages to insure a high heat content and rapid transfer of heat to the fuel that is being conditioned. The flame, through the medium of the vaporizer block which acts as the heat storage body, furnishes all of the heat needed to condition the fuel for combustion. Cheap fuel such as kerosene or distillate may be successfully employed. The fuel is vaporized at a constant optimum temperature regardless of the number of main burners operating.

Low-cost parts are used throughout the heater. The burner tubes 112 and 114 (which constitute combustion chambers for the main burners) and the heat exchanger sections 38 are made of lightweight, cheap material. The combustion air motor 272 is quite small, inasmuch as the combustion air pressure is not required to be very high (only a few inches of water above atmospheric pressure). The fuel feeding assembly 170 is small and consumes very little power. The entire equipment is easy to install and is inconspicuous because of its small size and compactness.

The apparatus, moreover, is safe and dependable in its operation. None of the room air is used for combustion, and the exhaust fumes are discharged outside of the building. The heater is in full operation within 15 seconds after being turned on, irrespective of how cold the heater is when starting. Adequate controls prevent hazards due to combustion failure and overheating and serve to regulate the air temperature within close limits. The igniter 132 is, in effect, a small burner which performs its own fuel conditioning electrically. There is no need for high precision in the design of the igniter element 142, since the fuel is fed to the igniter at a very small rate and is preheated so that it has no appreciable cooling effect upon the igniter element. Other features and advantages of the invention not specifically mentioned herein will be apparent to those skilled in the art.

While there has been illustrated and described a preferred embodiment of the invention, this structure is capable of being modified in many ways without departing from the teachings set forth herein. The appended claims, therefore, are intended to cover all modifications coming within the true spirit and scope of the invention.

I claim:

1. A liquid fuel-consuming heater comprising a burner case, a vaporizer block disposed in said burner case, a main burner tube extending transversely across the front of said block, a nozzle extending from said block into said tube in tangential relation therewith, means on said block defining a pilot burner for igniting fuel issuing from said nozzle, fuel vaporizing passages extending through said block respectively to said nozzle and to said pilot burner means, devices for supplying liquid fuel and air to said vaporizing passages, a first heat exchanger tube communicating axially with said burner tube and extending laterally from said burner case, a second heat exchanger tube communicating with said first heat exchanger tube and extending back to said burner case, and an exhaust duct communicating with the space within said burner case adjacent to said block.

2. A liquid fuel-consuming heater comprising a vertical mounting plate adapted to be supported by a wall or the like, a burner assembly spaced from said wall, a supporting plate for said burner assembly secured to said mounting plate, an air duct communicating with said burner assembly, said air duct extending through and being supported by said supporting plate and providing air for combustion to said burner assembly, a case enclosing said burner assembly, an exhaust duct connecting said case assembly to said supporting plate and providing a passage for removing exhaust gases from said case, heat exchanger tubes sealed to said burner case and extending laterally therefrom on either side thereof, said heat exchanger tubes providing a passage for products of combustion from said burner assembly to said burner case, and fins on said heat exchanger tubes.

3. In a heater of the internal combustion type having a fuel burning igniter, a pilot burner and a plurality of main burners, with means for supplying fuel to said ignitor, said pilot burner and said main burners from a liquid fuel source, the combination of an electric igniter element adapted when energized to ignite fuel fed to said igniter for thereby establishing a flame to light the pilot burner, whereby a pilot flame is established to light the main burners, a plurality of electrically operable devices respectively controlling the flow of fuel to the main burners, a thermal switch having a normal cold position and responsive to heat from the pilot burner for assuming a hot position, said switch being connected to said igniter element and said devices and being effective in its cold position to cause energization of said igniter element and preventing the operation of said devices and being effective in its hot position to cause deenergization of said igniter element and enabling said devices to operate, means for controlling the flow of fuel to said igniter for providing fuel thereto only when said igniter element is energized, and means including a thermal member responsive to the temperature of air heated by the heater and acting in conjunction with said thermal switch to close and open operating circuits for said devices selectively in accordance with heat requirements.

4. A liquid fuel-consuming air heater including in combination a heat-conducting vaporizing block having a first fuel-vaporizing passage extending therethrough terminating at the front of said block in a main burner port and having a second fuel-vaporizing passage extending therethrough terminating at the front of said block in a pilot burner port adjacent said main burner port; means for providing liquid fuel in each of said fuel-conditioning passages; means for delivering air under pressure to each of said passages; an igniter mechanism for initially heating said block to vaporize the fuel in said pilot burner vaporizing passage so that a combustible air-and-fuel mixture is supplied to said pilot burner port, and also for igniting said combustible mixture at said pilot burner port to develop a pilot flame; and a baffle displaced from said block facing said pilot burner port for directing a portion of the pilot flame back against said vaporizing block to maintain said block within a selected temperature range to vaporize the fuel in said fuel-vaporizing passages so that a combustible airand-fuel mixture is supplied to said main burner port, and for directing another portion of the pilot flame to the main burner port for igniting the combustible mixture at the last mentioned port.

5. A liquid fuel-consuming air heater including in combination; a heat-conducting vaporizing block having a first fuel-vaporizing passage extending therethrough terminating at the front of said block in a main burner port, and having a second fuel-vaporizing passage extending therethrough terminating at the front of said block in a pilot burner port adjacent said main burner port; means for depositing liquid fuel in each of said fuel vaporizing passages; means for delivering air under pressure to each of said passages; an ignitor mechanism for initially heating said block to vaporize the fuel in said pilot burner vaporizing passage so that a combustible air-and-fuel mixture is supplied to said pilot burner port, and also for igniting said combustible mixture at said pilot burner port to develop a pilot flame; a baffle displaced from said block facing said pilot burner port for directing a portion of the pilot flame back against said vaporizing block to maintain said block within a selected temperature range to vaporize the fuel in said fuel-vaporizing passages so that a combustible air-and-fuel mixture is supplied to said main burner port, and for directing another portion of the pilot flame to the main burner port for igniting the combustible mixture at the last-mentioned port; a combustion chamber for said main burner port; and means of relatively low heat conductivity connecting said last-mentioned combustion chamber to said vaporizing block for supporting said chamber adjacent said main burner port whereby the temperature of said block is substantially unaffected by the combustion products from said main burner port.

6. A liquid fuel-consuming air heater including in combination; a heat-conducting vaporizing block having a first fuel-vaporizing passage extending therethrough terminating at the front of said block in a main burner port, having a second fuel-vaporizing passage extending therethrough terminating at the front of said block in a pilot burner port adjacent said main burner port, and having a third passage extending therethrough terminating adjacent said pilot burner port; means for depositing liquid fuel in each of said fuel-vaporizing passages; means for delivering air under pressure to each of said fuel-vaporizing passages; an ignitor mechanism for establishing an igniter flame in said third passage initially to heat said block and vaporize the fuel in said fuel-vaporizing passages so that a combustible air-and-fuel mixture is supplied to said pilot burner and main burner ports, and also to ignite said combustible mixture at said pilot burner port to develop a pilot flame; and means for directing a portion of said pilot flame back against said vaporizing block to maintain said block in a heated condition and to direct a portion of said pilot flame to said main burner port for igniting the combustible mixture at the last-mentioned port.

7. A liquid fuel-consuming air heater including in combination; a heat-conducting vaporizing block having a first fuel-vaporizing passage extending therethrough terminating at the front of said block in a main burner port, having a second fuel-vaporizing passage extending therethrough terminating at the front of said block in a pilot burner port adjacent said main burner port, and having a third passage extending therethrough terminating adjacent said pilot burner port; means for depositing liquid fuel in said first and second fuel-vaporizing passages; means for delivering air under pressure to each of said fuel-vaporizing passages; and igniter mechanism for establishing an igniter flame in said third passage initially to heat said block and vaporize the fuel in said pilot burner vaporizing passage so that a combustible air-and-fuel mixture is supplied to said pilot burner port, and also to ignite said combustible mixture at said pilot burner port to develop a pilot flame; and a baffle supported adjacent said pilot burner port for directing a portion of the pilot flame against said vaporizing block to maintain said block within a selected temperature range to vaporize the fuel in said fuel-vaporizing passages so that a combustible air-and-fuel mixture is supplied to said main burner port, and for directing another portion of the pilot flame to the main burner port for igniting the combustible mixture at the last-mentioned port.

8. A liquid fuel-consuming heater including in combination; a burner case; a vaporizing block disposed in said burner case having at least one fuel-vaporizing passage extending therethrough terminating at the front of said block in a main-burner port; a main-burner tube within said case extending transversely across the front of said block in communicating tangential relation with said main burner port; means for supplying liquid fuel to said fuel-vaporizing passage; means for supplying air under pressure to said vaporizing passage; means for heating said block to vaporize the fuel in said fuel-vaporizing passage so that a combustible fuel-and-air mixture is supplied to said main burner port, and for igniting said combustible mixture at said port; a U-shaped heat-exchanger means communicating axially with said burner tube and extending laterally from said burner case and back to the interior of said burner case; and an exhaust duct communicating with the space within said burner case adjacent the said block.

9. A liquid fuel-consuming heater including in combination a burner case; a vaporizer block disposed in said burner case having at least one fuel-vaporizing passage extending therethrough terminating at the front of said block in a main burner port; an open-ended main burner tube within said case extending transversely across the front of said block in communicating tangential relation with said main burner port; means for supplying liquid fuel to said vaporizing passage; means for supplying air under pressure to said vaporizing passage; means for heating said block to vaporize the fuel in said vaporizing passage so that a combustible fuel-and-air mixture is supplied to said main burner port, and for igniting said combustible mixture at said port; a first U-shaped heat-exchanger means communicating axially with one end of said burner tube and extending laterally from said burner case and back to the interior of said burner case; a second U-shaped heat-exchanger means communicating axially with the other end of said burner tube and extending laterally from said burner case and back to the interior of said burner case; and an exhaust duct communicating with the space within said burner case adjacent the said block.

10. A liquid fuel-consuming heater including in combination, a burner case; a vaporizing block disposed in said burner case having at least one fuel-vaporizing passage extending therethrough terminating in a main-burner port at the front of said block; a main-burner tube within said case extending transversely across the front of said block in communicating tangential relation with said main-burner port; means for supplying liquid fuel to said fuel-vaporizing passage; an air duct extending into said case and communicating with the rear of said block for supplying air under pressure to said vaporizer passage; a U-shaped heat-exchanger means communicating axially with said burner tube and extending laterally from said burner case and back to the interior of said burner case; and an exhaust duct communicating with the space within said burner case adjacent to said block.

11. A liquid fuel-consuming air heater including in combination, a heat-conducting vaporizing block having a first fuel-vaporizing passage extending therethrough terminating at the front of said block in a main-burner port for said air heater, having a second fuel-vaporizing passage extending therethrough terminating at the front of said block in a pilot-burner port adjacent said main burner port, and having a flame-directing passage extending therethrough terminating adjacent said pilot-burner port; an electrically-operated fuel-consuming igniter mechanism coupled to the back of said flame-directing passage; means including an electrically-operated selector mechanism for supplying liquid fuel selectively to said first and second fuel-vaporizing passages and to said igniter; means for delivering air under pressure to each of said fuel-vaporizing passages and to said igniter; a first switching means initially closing a first energizing circuit to said selector when said block is in a relative cold condition to cause fuel to be supplied to said igniter, and initially closing an energizing circuit to said igniter whereby an igniting flame is produced in said flame-directing passage to heat said block; a thermally responsive switching means closing a second energizing circuit to said selector when said block has reached a selected temperature to cause fuel to be supplied to said pilot-burner vaporizing passage, whereby a pilot flame is ignited at said pilot-burner port by said igniter flame to further heat said block; a further thermally-responsive switching means closing a third energizing circuit to said selector when said block has reached a selected temperature higher than said first-mentioned selected temperature to cause fuel to be supplied to said main-burner vaporizing passage, whereby a main-burner flame is ignited at said main-burner port by said pilot flame; and a thermally-responsive element for opening said first switching means when said block has attained a temperature corresponding substantially to said second-mentioned selected temperature.

STANLEY J. BUDLANE.

References Cited in the file of this patent

UNITED STATES PATENTS

| Number | Name | Date |
|---|---|---|
| 1,349,876 | Doble | Aug. 17, 1920 |
| 1,394,807 | Blanchard | Oct. 25, 1921 |
| 1,656,486 | Huntington et al. | Jan. 17, 1828 |
| 1,688,435 | Resek et al. | Oct. 23, 1928 |
| 1,832,220 | Kerrihard et al. | Nov. 17, 1931 |
| 1,841,463 | Barber et al. | Jan. 19, 1932 |
| 2,073,073 | Pontow et al. | Mar. 9, 1937 |
| 2,090,039 | Goddard | Aug. 17, 1937 |
| 2,332,094 | McCollum | Oct. 19, 1943 |
| 2,390,380 | McCollum | Dec. 4, 1945 |
| 2,390,806 | Nagel | Dec. 11, 1945 |
| 2,391,447 | Edge | Dec. 25, 1945 |
| 2,421,370 | Budlane | June 3, 1947 |
| 2,438,275 | Fell et al. | Mar. 23, 1948 |
| 2,447,373 | Smoot | Aug. 17, 1948 |
| 2,457,862 | Briskin | Jan. 4, 1949 |
| 2,460,451 | Farrell | Feb. 1, 1949 |
| 2,465,711 | Clarkson | Mar. 29, 1949 |
| 2,484,385 | McCollum | Oct. 11, 1949 |
| 2,492,756 | McCollum | Dec. 27, 1949 |